United States Patent [19]

Kishida et al.

[11] Patent Number: 4,665,125
[45] Date of Patent: May 12, 1987

[54] THERMOPLASTIC RESIN COMPOSITION OF A POLYCARBONATE AND VINYL AROMATIC-VINYL CYANIDE COMONOMERS/DIENE RUBBER GRAFT COPOLYMER

[75] Inventors: Kazuo Kishida, Hiroshima; Hiroshi Kawasaki, Yokohama; Hideyuki Shigemitsu, Ohtake, all of Japan

[73] Assignee: Mitsubishi Rayon Company Limited, Tokyo, Japan

[21] Appl. No.: 798,431

[22] Filed: Nov. 15, 1985

[30] Foreign Application Priority Data

Nov. 20, 1984 [JP] Japan ................................. 59-245608
Nov. 27, 1984 [JP] Japan ................................. 59-249846

[51] Int. Cl.$^4$ ............................................. C08L 69/00
[52] U.S. Cl. ........................................ 525/67; 525/69; 525/146
[58] Field of Search ...................... 525/67, 146, 69, 77

[56] References Cited

U.S. PATENT DOCUMENTS 4,518,742  5/1985  Muramatsu et al. ................... 525/67
4,560,725 12/1985  Van Bokhoven et al. ........... 525/67
4,564,654  1/1986  Serini et al. ........................... 525/67

FOREIGN PATENT DOCUMENTS 0051336 12/1982  European Pat. Off. .
0108350  5/1984  European Pat. Off. .
1253226 11/1972  United Kingdom .

Primary Examiner—Theodore E. Pertilla
Attorney, Agent, or Firm—Oblon, Fisher, Spivak, McClelland, & Maier

[57] ABSTRACT

A thermoplastic resin composition having excellent heat resistance, impact resistance, moldability and platability, which comprises:

(i) from 10 to 90% by weight of a thermoplastic polycarbonate;

(ii) from 10 to 90% by weight of a graft copolymer obtained by firstly polymerizing a monomer mixture comprising more than 30 and not more than 50% by weight of acrylonitrile and at least 50 and less than 70% by weight of styrene, as monomers for the first stage of graft polymerization, in the presence of a rubber-like polymer, and then polymerizing a monomer mixture comprising from 15 to 40% by weight of acrylonitrile and from 60 to 85% by weight of $\alpha$-methylstyrene, as monomers for the second stage of graft polymerization, in the presence of the polymer obtained in the first stage; and (iii) from 0 to 60% by weight of a copolymer obtained by co-polymerizing from 50 to 80% by weight of an aromatic vinyl monomer and from 20 to 50% by weight of a vinyl cyanide monomer;

the total amount of components (i), (ii) and (iii) being 100% by weight. The composition is useful for making molded products having excellent heat resistance, impact resistance and platability.

4 Claims, No Drawings

THERMOPLASTIC RESIN COMPOSITION OF A POLYCARBONATE AND VINYL AROMATIC-VINYL CYANIDE COMONOMERS/DIENE RUBBER GRAFT COPOLYMER

The present invention relates to a thermoplastic resin composition having excellent heat resistance, impact resistance, moldability and platability. More particularly, it relates to a thermoplastic resin composition having excellent heat resistance, impact resistance, moldability and platability, which comprises a thermoplastic polycarbonate, a specific graft copolymer and, if necessary, a specific copolymer.

It has been proposed to obtain a resin composition having excellent heat resistance and impact resistance by blending a graft copolymer obtained by graft-polymerizing an aromatic vinyl monomer and a vinyl cyanide monomer in the presence of a rubber-like polymer and a copolymer obtained by co-polymerizing an aromatic vinyl monomer and a vinyl cyanide monomer, with a thermoplastic polycarbonate. (See, for instance, Japanese Unexamined Patent Publications No. 40536/1982, No. 55945/1982 and No. 147535/1982 and Japanese Examined Patent Publication No. 12300/1983.)

Further, Japanese Unexamined Patent Publication No. 102942/1982 discloses a resin composition obtained by blending a graft copolymer obtained by conducting the graft polymerization in two stages, with a thermoplastic polycarbonate.

However, in the conventional composition obtained by blending the above-mentioned graft copolymer and another copolymer with a thermoplastic polycarbonate, α-methylstyrene is used as a component for the copolymer for the improvement of the heat resistance. If a copolymer obtained by using α-methylstyrene is mixed to the graft copolymer, the impact resistance decreases substantially. To control the decrease in the impact resistance, various requirements have been made with respect to the particle size distribution of the rubber-like polymer in the graft copolymer, use of rubbers having different particle sizes or the content of the rubber-like polymer. Nevertheless, there has been developed no composition which fully satisfies the desired balance of the heat resistance, impact resistance and moldability. Furthermore, no consideration has been paid for the platability, and there has been developed no composition which gives satisfactory platability.

Under these circumstances, the present inventors have conducted extensive researches to develop a thermoplastic resin composition having an excellent balance of the heat resistance, impact resistance, moldability and platability. As a result, it has been discovered that the intended object can be attained in such a manner that in the preparation of the graft copolymer by graft polymerizing a monomer mixture of a vinyl cyanide monomer and an aromatic vinyl monomer to a rubber-like polymer, the graft polymerization is divided into two stages so that in the first stage, specific amounts of acrylonitrile and styrene are graft-polymerized and in the second stage, specific amounts of acrylonitrile and α-methylstyrene are graft-polymerized, and the graft copolymer thus obtained is blended with a thermoplastic polycarbonate, if necessary, together with a copolymer obtained by copolymerizing an aromatic vinyl monomer with a vinyl cyanide monomer. The present invention is based on this discovery.

Namely, the present invention provides a thermoplastic resin composition having excellent heat resistance, impact resistance, moldability and platability, which comprises:

(i) from 10 to 90% by weight of a thermoplastic polycarbonate;

(ii) from 10 to 90% by weight of a graft copolymer obtained by firstly polymerizing a monomer mixture comprising more than 30 and not more than 50% by weight of acrylonitrile and at least 50 and less than 70% by weight of styrene, as monomers for the first stage of graft polymerization, in the presence of a rubber-like polymer, and then polymerizing a monomer mixture comprising from 15 to 40% by weight of acrylonitrile and from 60 to 85% by weight of α-methylstyrene, as monomers for the second stage of graft polymerization, in the presence of the polymer obtained in the first stage; and (iii) from 0 to 60% by weight of a copolymer obtained by co-polymerizing from 50 to 80% by weight of an aromatic vinyl monomer and from 20 to 50% by weight of a vinyl cyanide monomer;

the total amount of components (i), (ii) and (iii) being 100% by weight.

Now, the present invention will be described in detail with reference to the preferred embodiments.

The thermoplastic polycarbonate in the present invention is obtainable from a dihydroxydiarylalkane and may optionally be branched. Such thermoplastic polycarbonates can be produced by conventional methods, and it is common to produce them by reacting a dihydroxy or polyhydroxy compound with phosgene or a diester of carbonic acid. Suitable dihydroxydiarylalkanes include those having an alkyl group, a chlorine atom or a bromine atom at the ortho position relative to the hydroxy group. As specific examples of preferred dihydroxydiarylalkanes, there may be mentioned 4,4'-dihydroxy-2,2-diphenylpropane (bisphenol A), tetramethyl bisphenol A, and bis-(A-hydroxyphenyl)-p-diisopropylbenzene. A branched polycarbonate may be produced, for instance, by substituting a part, e.g. from 0.2 to 2 mol %, of the dihydroxy compound by a polyhydroxy compound. As specific examples of such polyhydroxy compounds, there may be mentioned 1,4-bis-(4',4,2'-dihydroxytriphenyl-methyl)-benzene, fluoroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane and 2,2-bis[4,4-(4,4'-dihydroxyphenyl)-cyclohexyl]-propane.

As the rubber-like polymer as a constituting component of the graft copolymer in the present invention, there may be used in principle any rubber-like polymer having elastomeric properties. For instance, there may be mentioned polybutadiene, a butadiene-styrene copolymer, a butadiene-acrylonitrile copolymer, an ethylene-propylene-diene terpolymer, an acrylic rubber, a chlorinated polyethene rubber or a chloroprene rubber. They may be used alone or in combination as a mixture. The content of the rubber-like polymer in the graft copolymer is preferably from 10 to 80% by weight, more preferably from 10 to 70% by weight.

The graft copolymer in the present invention is obtained by graft-polymerizing a monomer mixture of a vinyl cyanide monomer and an aromatic vinyl monomer, in the presence of the above-mentioned rubber-like polymer in two stages. Namely, it is obtained by firstly polymerizing a monomer mixture comprising more than 30 and not more than 50% by weight of acrylonitrile and at least 50 and less than 70% by weight of styrene, as monomers for the first stage of graft polymerization, in the presence of the rubber-like polymer, and then polymerizing a monomer mixture comprising from 15 to 40% by weight of acrylonitrile and from 60 to 85% by weight of α-methylstyrene, as monomers for the second stage of graft polymerization, in the presence of the polymer obtained in the first stage.

In order to improve the heat resistance of a graft copolymer, it is common to introduce α-methylstyrene into the graft copolymer as a constituting component, or to incorporate a copolymer containing α-methylstyrene as a constituting component with the graft copolymer. However, in general, the impact resistance deteriorates if α-methylstyrene is graft-polymerized to the rubber-like polymer, or if a copolymer containing α-methylstyrene as a constituting component, is incorporated. The graft copolymers used in the present invention has features that it has heat resistance and yet undergoes no substantial deterioration in the impact resistance. Namely, as a result of various studies as to what resin structure the graft copolymer should have to obtain the desired thermoplastic resin composition by combining it with a thermoplastic polycarbonate, if necessary, together with a copolymer of an aromatic vinyl monomer and a vinyl cyanide monomer, it has been found that the desired composition can be obtained by the above-mentioned structure.

If the proportion of acrylonitrile in the mixture of monomers for the first stage of the graft polymerization to constitute the graft copolymer in the present invention, is less than 30% by weight, there will be drawbacks such that when a molded product made of a composition comprising the resulting graft copolymer and a thermoplastic polycarbonate, if necessary, together with an aromatic vinyl-vinyl cyanide copolymer, is plated, the plating speed will be slow, the plated layer is likely to undergo swelling by a thermal cycle test, and the adhesion of the plated layer will be poor, thus presenting poor plating properties. On the other hand, if the proportion of acrylonitrile exceeds 50% by weight, the development of the impact resistance or the moldability tends to be poor, and a deterioration of the graft resin portion is likely to result, such being undesirable. The rest of the monomers is styrene in the above-mentioned proportion. The amount of acrylonitrile in the monomer mixture for the second stage of graft polymerization is from 15 to 40% by weight from the viewpoint of the development of the impact resistance.

α-Methylstyrene in the monomer mixture for the second stage of graft polymerization to constitute the graft copolymer in the present invention, is preferably grafted as the outermost layer of the rubber-like polymer as much as possible, whereby not only the heat resistance is imparted, but also the deterioration of the impact resistance of the resulting graft copolymer can be prevented. If the proportion is outside the range of from 60 to 85% by weight, such effectiveness intended by the present invention is hardly obtainable.

The graft copolymer in the present invention can be obtained by conventional polymerization methods such as emulsion polymerization, emulsion-suspension polymerization or continuous bulk polymerization.

The copolymer in the present invention comprises from 50 to 80% by weight of an aromatic vinyl monomer and from 20 to 50% by weight of a vinyl cyanide monomer, with a view to imparting balanced properties of the heat resistance, impact resistance, moldability and platability, when incorporated to the mixture of the above-mentioned graft copolymer and the thermoplastic polycarbonate, as the case requires. As the aromatic vinyl monomer, there may be mentioned styrene, α-methylstyrene or vinyl toluene. These may be employed alone or in combination as a mixture. As the vinyl cyanide monomer, there may be mentioned acrylonitrile or methacrylonitrile. These may be employed alone or in combination as a mixture.

The above-mentioned copolymer in the present invention can be obtained by conventional polymerization methods such as emulsion polymerization, suspension polymerization or continuous bulk polymerization.

The thermoplastic resin composition of the present invention comprises (i) the thermoplastic polycarbonate, (ii) the graft copolymer, as essential components, and (iii) the copolymer as an optional component. The proportion of the respective components are determined by the required balance of the heat resistance, impact resistance, moldability and platability, and they are usually from 10 to 90% by weight, preferably from 10 to 70% by weight, of the thermoplastic polycarbonate (i), from 10 to 90% by weight, preferably from 10 to 70% by weight, of the graft copolymer (ii) and from 0 to 60% by weight, preferably from 10 to 60% by weight, of the copolymer (iii), the total amount of components (i), (ii) and (iii) being 100% by weight. The mixing method for this purpose may be any method commonly employed for blending resins. For the purpose of shaping, a conventional apparatus commonly used for the shaping of a resin can be used such as a single screw extruder, a double screw extruder or a Bumbury's mixer.

Further, to the thermoplastic resin composition of the present invention, there may optionally be incorporated additives such as a stabilizer, a lubricant, a plasticizer, a flame retardant, a dyestuff, a glass fiber or other fillers.

Now, the present invention will be described in further detail with reference to Examples. However, it should be understood that the present invention is by no means restricted to these specific Examples.

In the following Examples and Comparative Examples, "parts" and "%" mean "parts by weight" and "% by weight". The physical properties were determined in accordance with the following methods.

Izod impact strength:
  Measured in accordance with ASTM D-256.
Heat distortion temperature:
  Measured in accordance with ASTM D-648 under a load of 18.56 kg/cm$^2$.
Spiral flow:
  A spiral flow length (cm) was measured during the injection molding conducted by using an injection molding machine (1 ounce vertical type) SAV-30 manufactured by Sanjo Seiki K.K. and a mold having a resin path of semicircular cross section having a radius of 3 mm, under an injection pressure of 40.5 kg/cm$^2$ (gauge pressure), at a mold temperature of 60° C., at a cylinder temperature of 260° C., at the maximum injection rate with a molding cycle of 60 seconds.
Adhesive strength of the plated layer:
  Onto a shaped product of 50×90×3 mm molded at a mold temperature of 70°0 C. under the minimum injection rate, plating was applied under the following plating conditions to form a plated layer. Cut lines were engraved on the plated layer with a width of 2.5 cm, and the plated layer was pulled up vertically, whereupon the force required for peeling was calculated for a width of 1 cm.

Plating conditions

Etching ($CrO_2$ 400 g/liter/$H_2SO_4$: 20% by volume), treatment at 60° C. for 15 minutes Acid treatment (HCl: 10% by volume), treatment at room temperature for one minute treatment Catalyzer ("Catalyst A-30", manufactured by Okuno Seiyaku Kogyo K.K.), dipping at 20° C. for 2 minutes Accelerator ($H_2SO_4$: 10% by volume), dipping at 40° C. for 3 minutes Electroless copper plating ("N-100", manufactured by Okuno Seiyaku Kogyo K.K.), dipping at 30° C. for 10 minutes Electrolytic copper plating (copper sulfate: 200 g/liter, $H_2SO_4$: 50 g/liter; gloss agent ("Cupracid", manufactured by Schering Corp.) 1 ml/liter), dipping at 20° C. for 60 minutes at a current density of 4 A/$dm^2$ After baking (80° C. for 2 hours), the test sample was left to cool for 1 hour, and then subjected to the test.

Thermal cycle test of the plated layer:

Onto a shaped product of $100 \times 100 \times 3$ mm molded at a mold temperature of 70° C. at the maximum injection rate, plating was applied under the following plating conditions. The plated product was subjected to a three-cycle test with each cycle being $-35°$ C. for 1 hour →room temperature for 15 minutes →90° C. for 1 hour →room temperature for 15 mintues, whereupon the presence or absence of the swelling of the plated layer was observed.

Plating conditions

Etching ($CrO_2$ 400 g/liter/$H_2SO_4$: 15% volume), treatment at 60° C. for 15 minutes Acid treatment (HCl: 10% by volume), treatment at room temperature for 1 minute Catalyzer ("Catalyst A-30", manufactured by Okuno Seiyaku Kogyo K.K.), treatment at 20° C. for 2 minutes Accelerator ($H_2SO_4$: 10% by volume), treatment at 40° C. for 3 minutes Electroless nickel plating ("TMP", manufactured by Okuno Seiyaku Kogyo K.K.), treatment at 35° C. for 5 minutes Electrolytic copper plating, dipping at 20° C. for 20 minutes at a current density of 4 A/$dm^2$ Electrolytic nickel plating, dipping at 55° C. for 15 minutes at a current density of 3.5 A/$dm^2$ Electrolytic chromium plating, dipping at 45° C. for 2 minutes at a current density of 15 A/$dm^2$ EXAMPLES 1 to 8 and COMPARATIVE EXAMPLES 1 to 6

(1) Process I for the preparation of graft copolymers 30 parts (as solid content) of polybutadiene latex, 5 parts of acrylonitrile, 10 parts of styrene and 0.2 part of t-dodecylmercaptan were added to a reactor containing 150 parts of water, 2 parts of a wood rosin emulsifier, 0.5 part of dextrose, 0.2 part of sodium pyrophosphate and 0.01 part of ferrous sulfate. The temperature in the reactor was raised to 60° C., and 0.2 part of cumene hydroperoxide was added to initiate the polymerization. When the temperature in the reactor passed the maximum point and lowered to 65° C., a mixture comprising 14 parts of acrylonitrile, 41 parts of α-methylstyrene, 0.5 part of t-dodecylmercaptan and 0.6 part of cumene hydroperoxide, was continuously dropwise added over a period of 50 minutes. After the temperature in the reactor passed the maximum point, the reactor was left to cool for 1 hour. Then, the obtained graft copolymer latex was coagulated with dilute sulfuric acid, washed, filtered and dried to obtain a graft copolymer ABS-1.

Graft copolymers ABS-2, ABS-3, ABS-4, ABS-5, ABS-6 and ABS-7 were prepared in the same manner as the above-mentioned graft copolymerization except that the amount of the polybutadiene and the types and the amounts of the monomers for the first and second stages of graft polymerization were changed as identified in Table 1.

(2) Process II for the preparation of a graft copolymer 30 parts (as solid content) of polybutadiene latex, 19 parts of acrylonitrile, 10 parts of styrene, 41 parts of α-methylstyrene and 0.7 part of t-dodecylmercaptan were added to a reactor containing 150 parts of water, 2 parts of a wood rosin emulsifier, 0.5 part of dextrose, 0.2 part of sodium pyrophosphate and 0.01 part of ferrous sulfate.

The temperature in the reactor was raised to 60° C., and then 0.4 part of cumene hydroperoxide was added to initiate the polymerization. After the temperature in left to cool for 1 hour. Then, the graft copolymer latex thus obtained was coagulated with dilute sulfuric acid, washed, filtered and dried to obtain a graft copolymer ABS-8.

(3) Preparation of resin compositions and evaluation of the physical properties thereof Graft copolymers ABS-1 to ABS-8 obtained by the above-mentioned processes, copolymers AS-1 and AS-2 separately prepared by polymerization and having the compositions as identified in Table 2, and a polycarbonate derived from 4,4'-dihydroxy-2,2-diphenyl propane, were combined in the proportions as identified in Table 3, and mixed for 4 minutes by a Henschel mixer, and then pelletized by a 40 mm$\phi$ single screw extruder.

By using these pellets, various physical properties were measured in accordance with the above-mentioned methods. The results are shown in Table 3.

TABLE 1

| Type of graft copolymer | | ABS-1 | ABS-2 | ABS-3 | ABS-4 | ABS-5 | ABS-6 | ABS-7 | ABS-8 |
|---|---|---|---|---|---|---|---|---|---|
| Process for graft copolymer | | I | I | I | I | I | I | I | II |
| Composition of feed materials (parts) | Polybutadiene latex (solid content) | 30 | 50 | 70 | 30 | 50 | 15 | 30 | 30 |
| | Monomers for the first stage of graft polymerization | | | | | | | | |
| | Acrylonitrile | 5 | 5 | 5 | 3 | 4 | 6 | 3 | 19 |
| | Styrene | 10 | 8 | 9 | 17 | 8 | 9 | 17 | 10 |
| | α-Methylstyrene | — | — | — | — | 12 | 10 | — | 41 |
| | Monomers for the second stage of graft polymerization | | | | | | | | |
| | Acrylonitrile | 14 | 9 | 4 | 9 | 9 | 26 | 7 | — |

TABLE 1-continued

| Type of graft copolymer | ABS-1 | ABS-2 | ABS-3 | ABS-4 | ABS-5 | ABS-6 | ABS-7 | ABS-8 |
|---|---|---|---|---|---|---|---|---|
| α-Methylstyrene | 41 | 28 | 12 | 41 | 16 | 34 | 43 | — |

TABLE 2

| Composition of feed | Type of copolymer | |
|---|---|---|
| materials (%) | AS-1 | AS-2 |
| Acrylonitrile | 30 | 25 |
| Styrene | 70 | — |
| α-Methylstyrene | — | 75 |

TABLE 3

| | Example 1 | Example 2 | Example 3 | Example 4 | Example 5 | Example 6 | Example 7 | Example 8 |
|---|---|---|---|---|---|---|---|---|
| Proportions of the blended resins (parts) | | | | | | | | |
| Type of graft copolymer | | | | | | | | |
| ABS-1 | 40 | 50 | 80 | | 40 | 30 | | |
| ABS-2 | | | | 35 | | | 30 | |
| ABS-3 | | | | | | | | 15 |
| ABS-4 | | | | | | | | |
| ABS-5 | | | | | | | | |
| ABS-6 | | | | | | | | |
| ABS-7 | | | | | | | | |
| ABS-8 | | | | | | | | |
| Type of copolymer | | | | | | | | |
| AS-1 | | | | | | 20 | | |
| AS-2 | | | | | 20 | | 40 | 45 |
| Polycarbonate | 60 | 50 | 20 | 65 | 40 | 50 | 30 | 40 |
| Physical properties | | | | | | | | |
| Izod impact strength (kg · cm/cm) | 37 | 35 | 19 | 40 | 39 | 41 | 37 | 35 |
| Heat distortion temp. (°C.) | 125 | 120 | 112 | 123 | 115 | 110 | 114 | 116 |
| Spiral flow (cm) | 18 | 20 | 27 | 18 | 23 | 22 | 24 | 24 |
| Adhesive strength of plated layer (kg/cm) | 1.0 | 1.3 | 1.5 | 1.4 | 1.2 | 1.0 | 1.3 | 1.2 |
| Thermal cycle test of plated layer* | O | O | O | O | O | O | O | O |

| | Comparative Example 1 | Comparative Example 2 | Comparative Example 3 | Comparative Example 4 | Comparative Example 5 | Comparative Example 6 |
|---|---|---|---|---|---|---|
| Proportions of the blended resins (parts) | | | | | | |
| Type of graft copolymer | | | | | | |
| ABS-1 | | | | | | |
| ABS-2 | | | | | | |
| ABS-3 | | | | | | |
| ABS-4 | 50 | | | 30 | | |
| ABS-5 | | 40 | | | | |
| ABS-6 | | | | | 50 | |
| ABS-7 | | | | | | 60 |
| ABS-8 | | | 70 | | | |
| Type of copolymer | | | | | | |
| AS-1 | | | | | | |
| AS-2 | | | | 30 | 20 | |
| Polycarbonate | 50 | 60 | 30 | 40 | 30 | 40 |
| Physical properties | | | | | | |
| Izod impact strength (kg · cm/cm) | 25 | 30 | 15 | 20 | 15 | 27 |
| Thermal deformation temp. (°C.) | 120 | 120 | 112 | 114 | 114 | 112 |
| Spiral flow (cm) | 18 | 20 | 25 | 23 | 20 | 16 |
| Adhesive strength of plated layer (kg/cm) | 0.6 | 0.6 | 0.5 | 0.5 | 0.9 | 0.5 |
| Thermal cycle test of plated layer° | X | X | X | X | O | X |

O: No swelling of plated layer observed
X: Swelling of plated layer observed

As described in the foregoing, the thermoplastic resin compositions of the present invention have well balanced heat resistance, impact resistance, moldability and platability, and thus very useful as molding materials in various fields where heat resistance, impact resistance and high flowability are required, such as automobile parts, particularly wheel caps or front grills, or large size thin molded products.

We claim:

1. A thermoplastic resin composition having excellent heat resistance, impact resistance, moldability and platability, which comprises:
   (i) from 10 to 90% by weight of an aromatic polycarbonate;
   (ii) from 10 to 90% by weight of a graft copolymer obtained by firstly polymerizing a monomer mixture comprising more than 30 and not more than 50% by weight of acrylonitrile and at least 50 and less than 70% by weight of styrene, as monomers for the first stage of graft polymerization, in the presence of a diene rubber selected from the group consisting of polybutadiene, a butadiene-styrene copolymer and a butadiene-acrylonitrile copolymer, and then polymerizing a monomer mixture comprising from 15 to 40% by weight of acrylonitrile and from 60 to 85% by weight of α-methylstyrene, as monomers for the second stage of graft polymerization, in the presence of the polymer obtained in the first stage; and (iii) from 0 to 60% by weight of a copolymer obtained by co-polymerizing from 50 to 80% by weight of an aromatic vinyl monomer and from 20 to 50% by weight of a vinyl cyanide monomer;

the total amount of components (i), (ii), and (iii) being 100% by weight.

2. The thermoplastic resin composition according to claim 1, wherein the graft copolymer contains from 10 to 80% by weight of the diene rubber.

3. The thermoplastic resin composition according to claim 1, wherein the graft copolymer contains from 10 to 70% by weight of the diene rubber.

4. The thermoplastic resin composition according to claim 1, wherein said component (iii) is from 10 to 60% by weight based on the total resin composition.

* * * * *